April 2, 1940.  C. A. NICHOLS ET AL  2,195,751
MANUFACTURE OF MULTIPLY TUBING
Filed Aug. 5, 1938   7 Sheets-Sheet 1
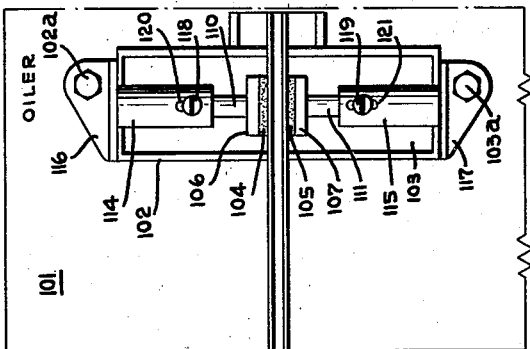
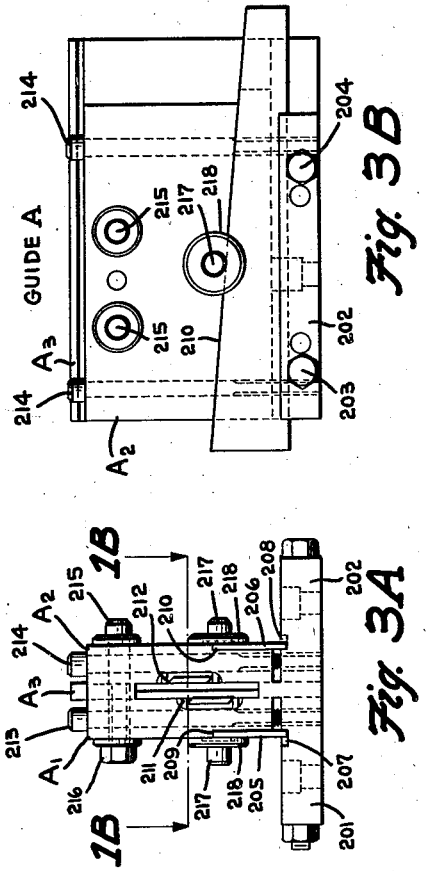
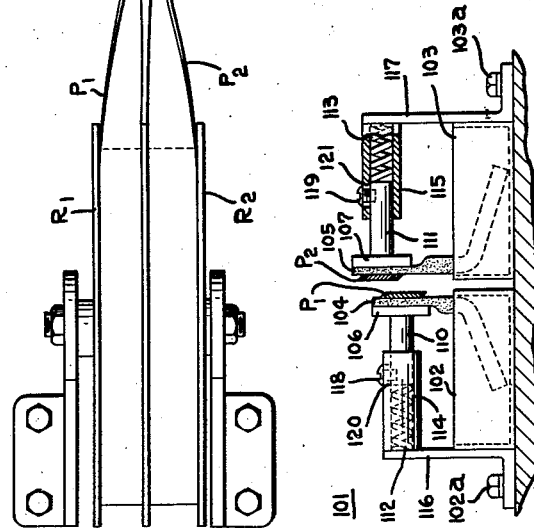
INVENTORS
Charles A. Nichols
Raymond H. Bish
BY
Spencer Hardman & Fehr
their ATTORNEYS

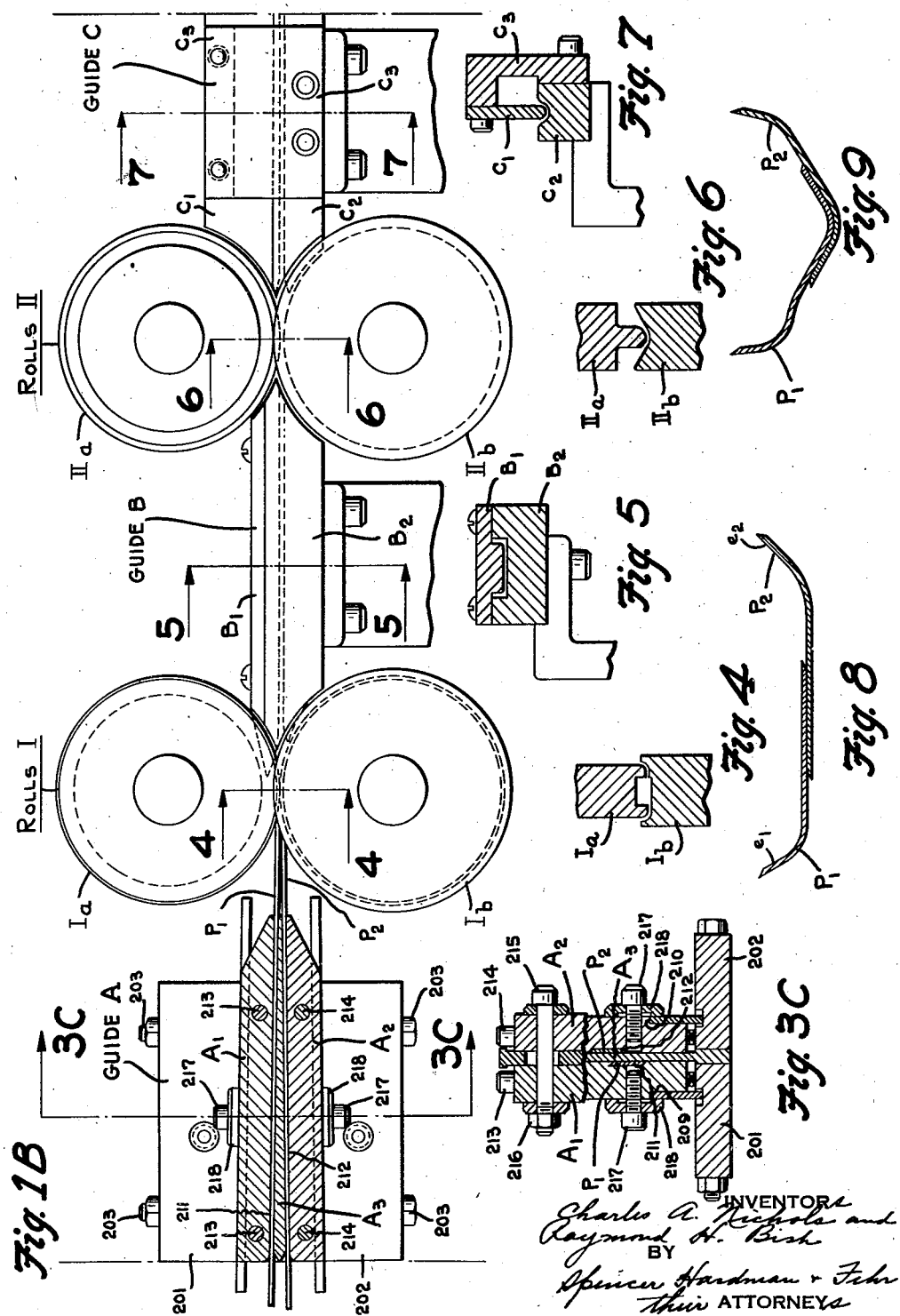

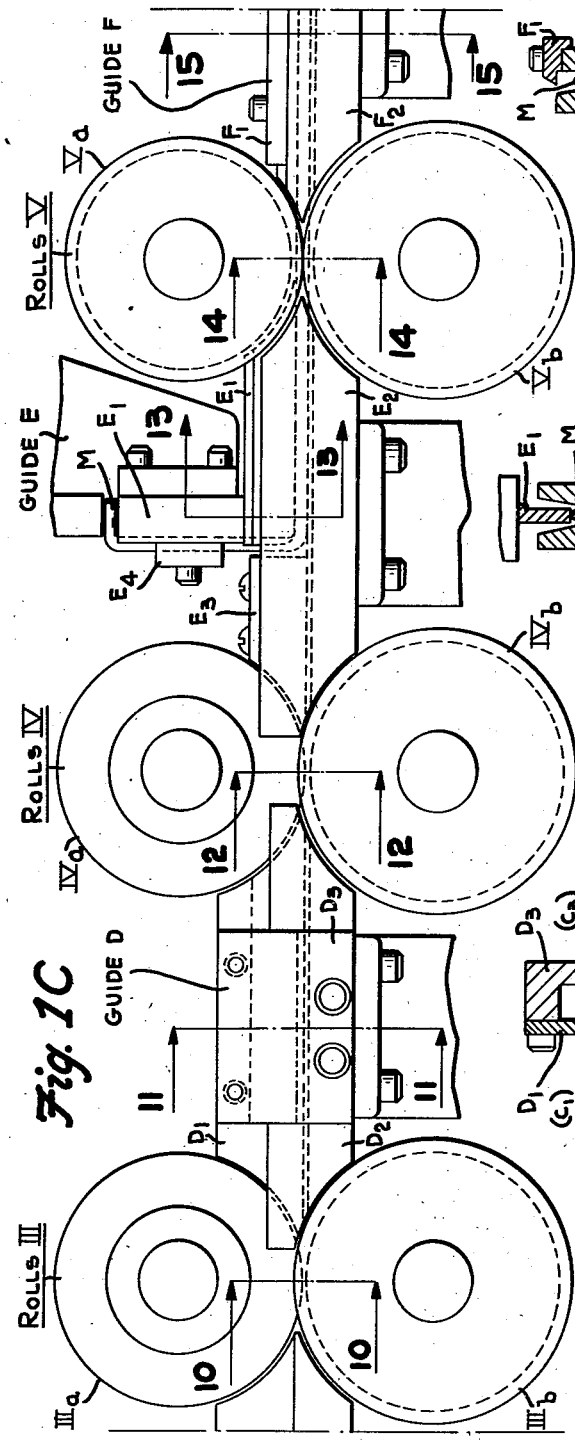

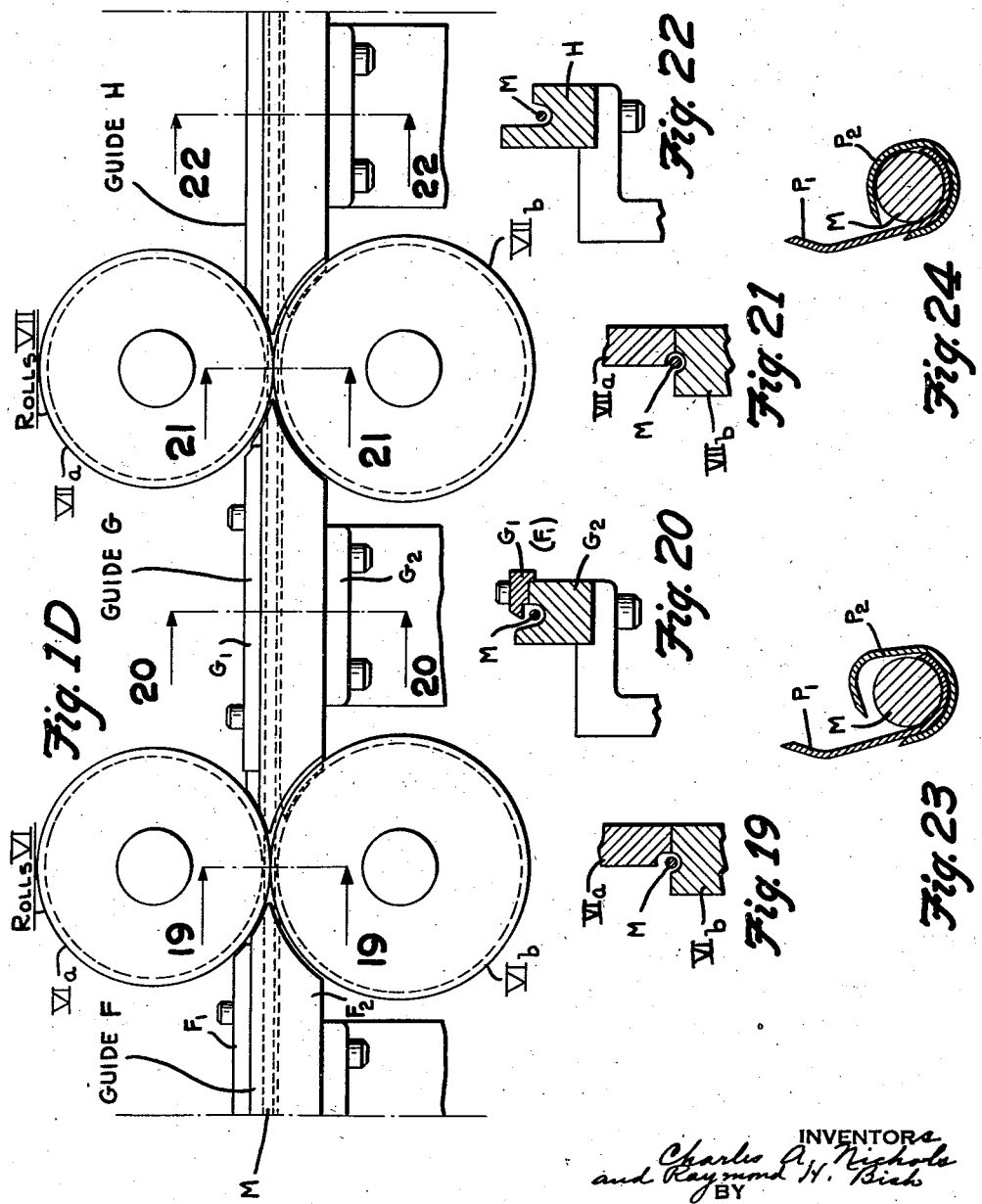

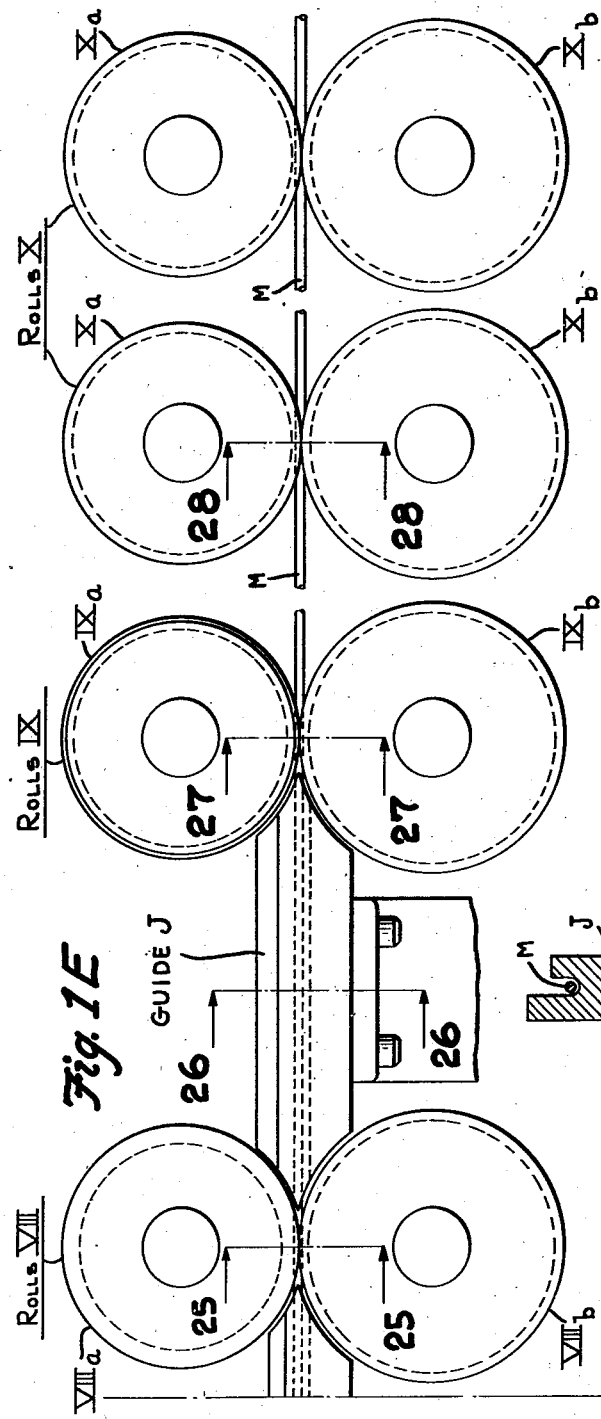

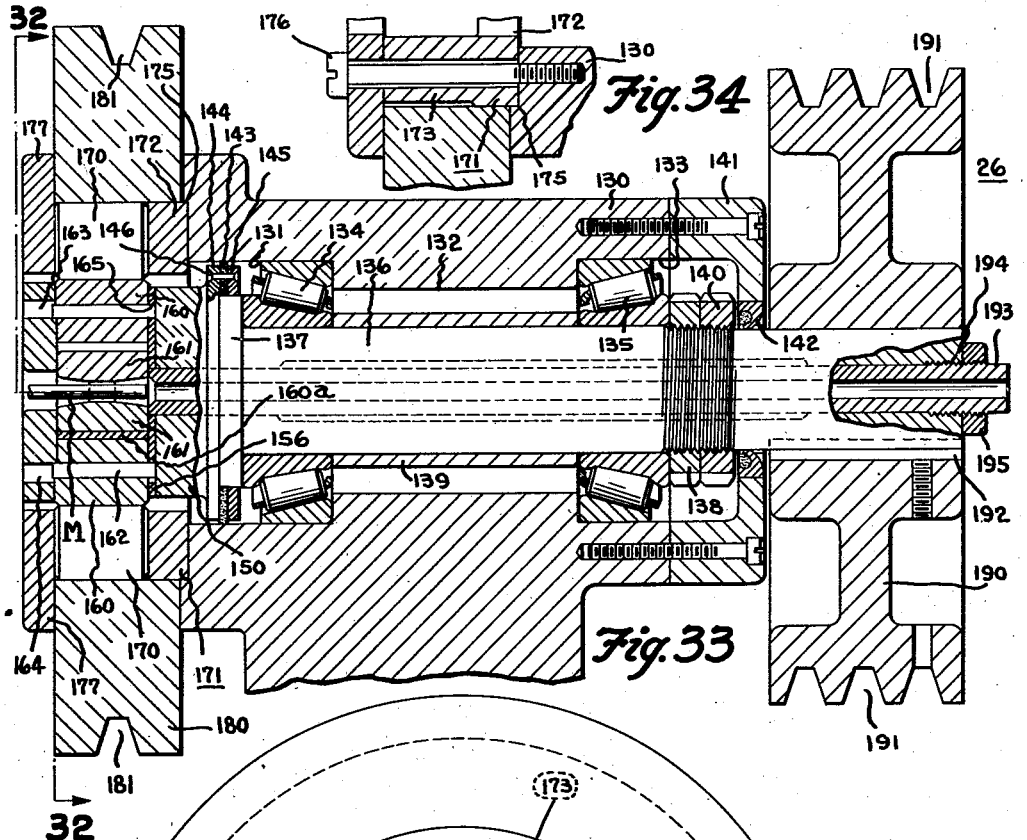

April 2, 1940.  C. A. NICHOLS ET AL  2,195,751
MANUFACTURE OF MULTIPLY TUBING
Filed Aug. 5, 1938  7 Sheets-Sheet 7

INVENTORS
Charles A. Nichols and
Raymond H. Birh
BY
Spencer Hardman & Fehr
their ATTORNEYS Patented Apr. 2, 1940

2,195,751

UNITED STATES PATENT OFFICE 2,195,751

MANUFACTURE OF MULTIPLY TUBING

Charles A. Nichols and Raymond H. Bish, Anderson, Ind., assignors to General Motors Corporation, Detroit, Mich., a corporation of Delaware Application August 5, 1938, Serial No. 223,245

6 Claims. (Cl. 113—33)

This invention relates to improvements in the manufacture of multiply tubing made by forming a plurality of flat strips of steel into concentric cylindrical plies with the seams of the plies disposed a substantial distance apart. The tubing is completed by passing it through a bath of molten brazing metal which penetrates the interstices between the seams and plies to bond the seams and plies together.

It is a primary aim and object of the present invention to provide a novel tube forming method and apparatus by which the formation of multiply tubing may be carried on continuously and at a relatively great speed of travel of the tube stock. This object is accomplished by forming overlapping strips of steel stock into multiply tubular shape approximately the shape of the finished product and then by swaging the approximately formed plies of tubing into the desired shape with the plies substantially cylindrical and concentric and closely compacted together with their seams substantially closed. More specifically the overlapping portions of the strips are simultaneously formed into semi-cylindrical or half tubular portions of the completed plies. Then the outer ply is formed into approximately cylindrical formation and then the inner ply is formed around a portion of the outer ply and into approximately cylindrical formation. Then follows the swaging opertion which causes the plies to be compacted closely with the seams practically closed. The resulting tubing comprises an inner layer provided by lapping sections of the two plies of stock, and an outer layer likewise provided by lapping sections of the same two plies of stock. In other words each ply provides one half of the inner layer and one half of the outer layer of the tubing. The advantages of this construction will be made apparent hereinafter.

Further objects and advantages of the present invention will be apparent from the following description, reference being had to the accompanying drawings wherein, a preferred embodiment of the present invention is clearly shown.

In the drawings:

Fig. 1A on Sheet 1, Fig. 1B on Sheet 2, Fig. 1C on Sheet 3, Fig. 1D on Sheet 4 and Fig. 1E on Sheet 5 taken together constitute a plan view of a tube forming mill embodying the present invention. In Fig. 1B, the sectional view of Guide A is taken on the line 1B—1B of Fig. 3A on Sheet 1.

Fig. 2A on Sheet 1 is an end elevation of the strip oiler shown in Fig. 1A on Sheet 1.

Figs. 3A and 3B on Sheet 1 are end and side views respectively of Guide A.

Fig. 3C on Sheet 2 is a sectional view of Guide A on line 3C—3C of Fig. 1B.

Fig. 4 is a sectional view on the line 4—4 of Fig. 1B.

Fig. 5 is a sectional view on the line 5—5 of Fig. 1B.

Fig. 6 is a sectional view on the line 6—6 of Fig. 1B.

Fig. 7 is a sectional view on the line 7—7 of Fig. 1B.

Fig. 8 is an enlarged sectional view of overlapping strips of stock resulting from formation at section 4—4 of Fig. 1B.

Fig. 9 is an enlarged sectional view of overlapping strips of stock resulting from formation at section 6—6 of Fig. 1B.

Fig. 10 on Sheet 3 is a sectional view on the line 10—10 of Fig. 1C.

Fig. 11 is a sectional view on the line 11—11 of Fig. 1C.

Fig. 12 is a sectional view on the line 12—12 of Fig. 1C.

Fig. 13 is a sectional view on the line 13—13 of Fig. 1C.

Fig. 14 is a sectional view on the line 14—14 of Fig. 1C.

Fig. 15 is a sectional view on the line 15—15 of Fig. 1C.

Fig. 16 is an enlarged sectional view of the strips of stock resulting from formation at section 10—10 of Fig. 1C.

Fig. 17 is an enlarged sectional view of the strips of stock resulting from formation at section 12—12 of Fig. 1C.

Fig. 18 is an enlarged sectional view of the strips of stock resulting from formation at section 14—14 of Fig. 1C.

Fig. 19 on Sheet 4 is a sectional view on the line 19—19 of Fig. 1D.

Fig. 20 is a sectional view on the line 20—20 of Fig. 1D.

Fig. 21 is a sectional view on the line 21—21 of Fig. 1D.

Fig. 22 is a sectional view on the line 22—22 of Fig. 1D.

Fig. 23 is an enlarged sectional view of the strips of stock resulting from formation at section 19—19 of Fig. 1D.

Fig. 24 is an enlarged sectional view of the strips of stock resluting from formation at section 21—21 of Fig. 1D.

Fig. 25 on Sheet 5 is a sectional view on the line 25—25 of Fig. 1E.

Fig. 26 is a sectional view on the line 26—26 of Fig. 1E.

Fig. 27 is a sectional view on the line 27—27 of Fig. 1E.

Fig. 28 is a sectional view on the line 28—28 of Fig. 1E.

Fig. 29 is an enlarged sectional view of the strips of stock resulting from formation at section 25—25 of Fig. 1E.

Fig. 30 is an enlarged sectional view of the strips of stock resulting from formation at section 27—27 of Fig. 1E.

Fig. 31 is an enlarged sectional view of the strips of stock resulting from formation at section 28—28 of Fig. 1E.

Fig. 32 on Sheet 6 is an end view partly in section of the swager, this view being taken along the line and in the direction of the arrows 32—32 of Fig. 33.

Figure 35:
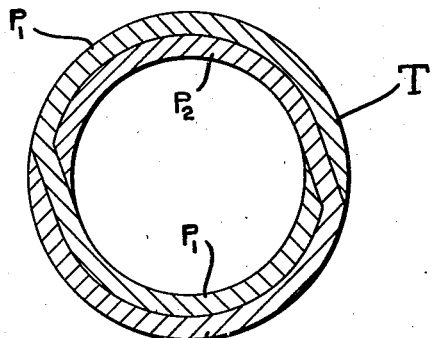

Fig. 33 is a longitudinal vertical sectional view through the rotary swager which forms the tubing into the form shown in Fig. 35.

Fig. 34 is a fragmentary sectional view on the line 34—34 of Fig. 32.

Fig. 35 on Sheet 7 is an enlarged sectional view of the stock after having been operated upon by the rotary swager shown in the other views on Sheet 6.

Figure 36:
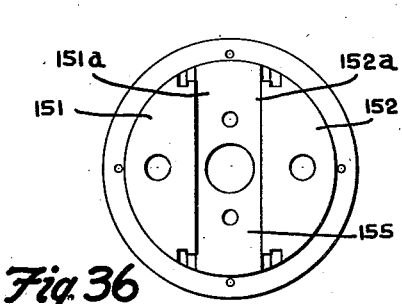
Figure 37:
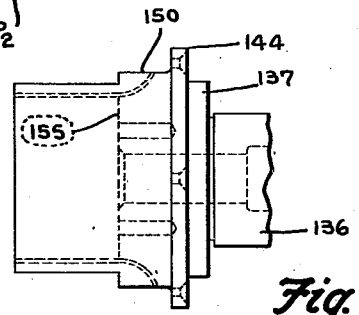

Figs. 36 and 37 are end and fragmentary side views, respectively, of the spindle of the rotary swager shown in Figs. 32 and 33 on Sheet 6.

Figure 38:
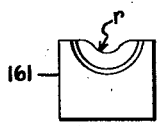
Figure 39:
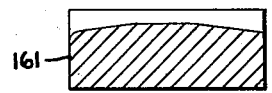

Figs. 38 and 39 are end and longitudinal sectional views, respectively, of one of the swaging blocks, these views being drawn approximately twice the scale of Figs. 36 and 37.

Figure 40:
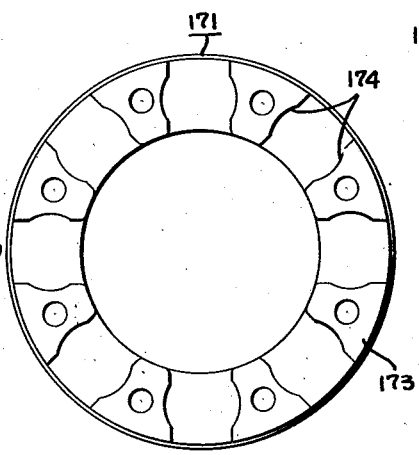
Figure 41:
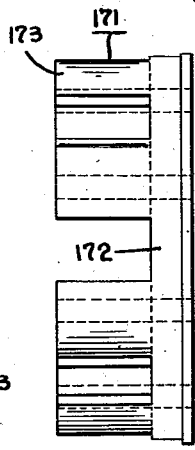

Figs. 40 and 41 are end and side views, respectively, of the roller cage of the rotary swager shown in Figs. 32 and 33.

The multiply tubing lettered T in Fig. 35, Sheet 7, comprises an inner ply $P_1$ and an outer ply $P_2$ having their edges bevelled or scarfed at 20° angles as shown in Fig. 8, Sheet 2. For ¼" O. D. tubing the plies of steel are .013" to .015" thick. Before scarfing, the plies are .7275" to .7325" wide and are scarfed to .743" to .748" wide. The plies are scarfed by means of scarfing rollers designed to produce the required bevel. The ply strips $P_1$ and $P_2$ are supplied from reels $R_1$ and $R_2$ respectively (Fig. 1A, Sheet 1), from which they are unwound by the operation of the tube forming apparatus. The plies pass first through a degreaser 100 which removes all of the oil previously placed upon the strip steel to protect it from rust. The degreaser is a rectangular box containing a cleaning liquid which is heated to produce a vapor which thoroughly cleanses the strips.

The cleansed plies $P_1$ and $P_2$ then pass to the oiler 101 which applies oil to the inner surface of the inner ply $P_1$ and to the outer surface of the outer ply $P_2$ but not to adjacent surfaces of the two plies. Lubrication of the plies is necessary in order to reduce friction and prevent the galling of the arbor or mandrel and rolls of the forming apparatus by the plies of steel passing through. If the oil on the plies is excessive, the tubing will become carburized in the brazing furnace in which the tubing is subjected to the bath of molten brazing metal. Therefore, a close control of the amount of oil on the plies is imperative. To control the amount of oil, the plies are first passed through a degreaser to remove all of the oil previously on the plies and a wick type oiler is used to apply the correct amount of oil of known composition. Any light oil free of sulphur, such as commercial "ceresinol," would be satisfactory.

The oiler 101 comprises oil vessels 102 and 103 for containing oil absorbed by wicks 104 and 105 respectively, urged by plunger pads 106 and 107 against the remote sides of plies $P_1$ and $P_2$ respectively. Pad 106 is mounted on a plunger 110 urged by a spring 112 toward ply $P_1$, and pad 107 is mounted on a plunger 111 urged by a spring 113 toward the ply $P_2$. The plunger 110 and spring 112 are supported by a guide tube 114 mounted on a bracket 116. A screw or pin 118 passes through a slot 120 in the tube 114 and is attached to the plunger 110 in order to prevent rotation of the pad 106 and to limit movement of pad 106 toward ply $P_1$. Likewise, plunger 111 and spring 113 are supported by a tube 115 carried by a bracket 117. A pin 119 passes through a slot 121 and tube 115 and is fixed to the plunger 111 in order to prevent rotation of the pad 107 and to limit movement of pad 107 toward ply $P_2$. Vessels 102 and 103 are hingedly attached to the rolling machine by screws 102a and 103a to permit swinging the oilers away from stock guide A while threading new stock into the rolling machine. The wicks absorb a limited supply of oil from the vessels 102 and 103 and apply only a very thin film of oil to the plies $P_1$ and $P_2$. The amount of oil supplied is sufficient for the lubrication of material as it passes through the forming apparatus and a slight amount of oil will remain on the inside of the tubing as it enters the brazing furnace. This oil forms a gas in the brazing furnace which combines with the oxygen inside the tubing and prevents oxidation of the inside of the tubing. The exterior of the tubing is protected while passing through the brazing furnace by introducing into the furnace a supply of reducing gas.

The adjacent surfaces of the plies $P_1$ and $P_2$ should be free from oil, since no useful purpose is served by applying oil to these surfaces. The amount of oil taken by the tubing into the brazing furnace should be as small as possible in order to eliminate the carburizing effect of this oil. Therefore, the oiler is constructed so as not to place any oil between the plies.

As shown in Figs. 1B, 1C, 1D and 1E the rolling machine comprises guides A, B, C, D, E, F, G, H and J and sets of rolls numbered with roman numerals from I to X. The rolls are driven by vertical shafts which are so geared together and to a source of power that the peripheral speed of the surfaces of the rollers engaging the stock is substantially the same. For the manufacture of ¼" O. D. tubing, a speed of 18 ft. per min. has been found satisfactory. All of the guides and rolls are made of chromium plated hardened steel.

Guide A on Sheet 2 comprises plates $A_1$ and $A_2$ and an intermediate plate $A_3$ which maintain the plies $P_1$ and $P_2$ in the relation shown in Fig. 3C with the predetermined amount of overlap. Plate A, has a groove 211 which guides the ply $P_1$. Plate $A_2$ has a groove 212 which guides the ply $P_2$. The lower portion of plate $A_3$ is clamped between two base plates 201 and 202 secured by through bolts 203 and 204. Plates $A_1$ and $A_2$ are vertically adjustable along plate $A_3$. The positions of plates $A_1$ and $A_2$ are determined by wedges 205 and 206, respectively. The lower edges of wedges 205 and 206 are received, respectively, by grooves 207 and 208 provided by plates 201 and 202, respectively. Wedges 205 and 206 cooperate, respectively, with shoulders 209 and 210, respectively, of plates A1 and A2, respectively. Shoulders 209 and 210 are inclined to the horizontal as shown in Fig. 3B. These wedges having been so located that the guiding grooves 211 and 212 of plates A1 and A2 are positioned to give the plies P1 and P2 the correct amount of overlap, plates A1 and A2 are secured in the required position of adjustment by tightening screws 213 and 214 which pass vertically through these plates and are threaded into holes tapped into base plates 201 and 202, respectively. Plates A1 and A2 are secured in the required position also by clamping bolts 215 which pass through round holes in plates A1 and A2 and through vertical slots in plate A3 and which cooperate with nuts 216. Wedges 209 and 210 are secured in position also by screws 217 passing through washers 218 and threaded into tapped holes in plates A1 and A2.

The first set of rolls I, comprising rolls I$_a$ and I$_b$, receives the plies from guide A and rolls a curve on the outside edge of each ply thereby producing work having a cross-section as shown in Fig. 8. The work then passes through guide B comprising members B1 and B2 which cooperate to provide a channel-shaped passage through which the work, as shown in Fig. 8, passes. The turned-up edges $e_1$ and $e_2$ of plies P1 and P2 respectively, cooperate with the side walls of this channel to hold the plies in correct relation without changing the overlap while the plies move to the next set of rolls II.

Rolls II, comprising roll II$_a$ and roll II$_b$, start forming on the center of the work curving it up to an angle of about 120°, as shown in Fig. 9 which is drawn to a larger scale than Fig. 6. The plies P1 and P2 are so off set that this 120° bend is located about one-quarter of the way in from the edges of the plies. The plies are maintained substantially in the position shown in Fig. 9 while they pass through the guide C comprising members C1, C2 and C3. The space between the members C1 and C2 which is arcuate in cross-sectional contour receives the overlapping 120° bent portions of the plies P1 and P2 and prevents lateral displacement.

Rolls III which comprise rolls III$_a$ and III$_b$ form the work into the shape shown in Fig. 16 in which the sides thereof appear to make an angle approximately 60°, which is a sort of V-shaped formation. The work then passes through guide D which comprises parts D1, D2 and D3. Part D1 is the same as part C1 of guide C, and part D3 is the same as part C3 of guide C. The space between guide parts D1 and D2 is arcuate in cross-section and receives the bent overlapping portions of the plies. The part D2 provides a V-shaped channel, the sides of which are approximately 60°.

From guide D the work passes through rolls IV comprising rolls IV$_a$ and IV$_b$ which form the work into the shape shown in Fig. 17, in which the work is formed into as nearly a U-shape as is possible. Then the work passes through guide E comprising part E1, part E2, and an arbor or mandrel M which is attached to guide part E1 by the part E4. The mandrel M projects into a space between the adjacent ends of guide parts E1 and E3 and then is bent at right angles and extends through a deep V-shaped channel in the guide part E2 as shown in Fig. 13. Mandrel M extends through all of the subsequent rolls and guides and into the rotary swager shown in Fig. 33.

Up to the point where the work enters between the rolls V, as substantially shown in Fig. 17, the previously described rolls and guides have caused the work to be shaped so that the overlapping portions of the plies have been formed simultaneously into approximately one-half cylindrical portions. Between rolls V, comprising rollers V$_a$ and V$_b$, the completion of the formation of the outer ply P2 is begun. The rolls V change the shape from that shown in Fig. 17 to that shown in Fig. 18. Then the work passes through guide F comprising part F1 and part F2. The mandrel M which occupies a position near the bottom of the groove in part F2 tends to maintain the one-half cylindrical portions of the plies in correct relation while the non-overlapping portion of the ply P2 is being formed. After the work passes through guide F, it passes through rolls VI comprising VI$_a$ and VI$_b$, which shape the work substantially into the form shown in Fig. 23. Then the work passes through guide G comprising a part G1 which is the same as part F1 of guide F and a part G2. Then the work passes through rolls VII, comprising VII$_a$ and VII$_b$, which form the work into the shape shown in Fig. 24. The outer ply P2 has been formed very roughly into tubular formation while the formation of the inner ply P1 remains uncompleted.

Next, the work passes through guide H. Guide H cooperates with the mandrel M to guide the work to rolls VIII, which include VIII$_a$ and VIII$_b$, which change the shape of the inner ply P1 from that shown in Fig. 24 to that shown in Fig. 29.

The work then passes through guide J and then between rolls IX, comprising IX$_a$ and IX$_b$, where the work is shaped into the form shown in Fig. 30. Then the work passes between rolls X, comprising two pairs of rolls like X$_a$ and X$_b$. The first pair of rolls X$_a$ and X$_b$ shape the work into the form shown in Fig. 31, which shows that the plies have been formed only approximately into cylindrical formation and that the plies have not been compacted together so that the space between them is at the minimum and that the edges of the inner plies are abutting and the bevelled edges of the outer plies are completely overlapping. The second pair of rolls X$_a$ and X$_b$ are used to assist in pulling the work through the machine since no rolls after rolls IV have any definite traction on the tubing.

The completion of the formation of the tubing T with closely compacted plies and closely contracted seams as shown in Fig. 35, on Sheet 7, is effected by a rotary swaging machine illustrated in Figs. 32, 33 and 34 on Sheet 6 and Figs. 36 to 41 on Sheet 7.

The rotary swaging machine comprises a frame 130 having a stepped or shouldered bore comprising portions 131, 132 and 133. The bores 131 and 133 receive tapered roller bearings 134 and 135 which support a tubular shaft 136 having a shoulder 137 against which the inner race of bearing 134 is urged by the tightening of a nut 138 which urges the inner race of bearing 135 against a spacer 139 which in turn bears against the inner race of bearing 134. Nut 138 which is threaded on shaft 136 is locked in position by locknut 140. The space to the right of nuts 138 and 140 and the bearing 135 is enclosed by a cup-shaped plate 141 which is attached to the frame 130 and which supports an oil or grease sealing ring 142 to prevent escape of lubricant toward the right along the shaft 136. Escape of lubricant to the left from the bearing 134 is minimized by a felt washer 143 secured between an annular flange 144 of the shaft 136 and a metal washer 145. The parts 145 and 143 are secured to the flange 144 by rivets 146.

As shown also in Figs. 36 and 37 on Sheet 7, the shaft 136 has a head 150 from which extends two symmetrical bosses 151 and 152 which are similar segments of a cylinder. The surfaces 151a and 152a of these bosses receive hard metal liners 153 and 154, respectively, as shown in Fig. 32. The surface 155 of the head 150 located between the bosses 151 and 152 receives a hard metal liner 156 as shown in section in Fig. 33. These liners support and guide swaging hammers 160 which work against swaging dies 161, one of which is shown in detail in Figs. 38 and 39 which are drawn to about twice the scale of Figs. 32, 33 and 34. Each hammer 160 carries a pin 162, the ends of which project beyond the end surfaces of the hammers. As shown in Fig. 33, the left end of the pin 162 extends into a slot 163 in a plate 164 fastened to the bosses 151 and 152. The right hand end of the pin 162 extends into a slot 165 in the liner 156 formed and located similar to the slot 163. The pins 162 cooperate with plate 164 and liner 156 to limit outward movement of the hammers due to centrifugal force. When the tubing is passing through the swager the pins 162 do not bottom in the slots 163 and 165. The spaces between the hammers 160 and the dies 161 are occupied by one piece shims 160a of such thickness as to transmit the movement of the hammers to the dies to cause the dies to swage the tubing to the desired diameter.

As the shaft 136 rotates, the hammers 160 are caused to strike against rollers 170 supported by a stationary roller cage 171, details of which are shown in Figs. 40 and 41 on Sheet 7. The cage 171 comprises an annulus 172 from which extends a plurality of bosses 173 spaced apart so as to provide pockets 174 each for receiving a roller 170. As shown in Fig. 34, the annulus 172 of the cage 171 is received within a shouldered recess 175 in the frame 130 and is secured therein by screws 176 which also secure to the bosses 173 of the roller cage 171 an annular cover plate 177. The outer cylindrical surfaces of the annulus 172 and of the bosses 173 provide cylindrical bearing for a rotary disc 180 having a V-groove 181 for receiving a driving V-belt, not shown. The disc 180 is confined between the plate 177 and the opposite face of the frame 130.

The shaft 136 supports a driving pulley 190 having three V-grooves 191 each for receiving a driving V-belt. Pulley 190 is fixed to the shaft 136 by key 192. Shaft 136 supports a guide tube 193 which is threaded into the shaft 136 as indicated at 194 and is locked in position by a lock-nut 195. This guide tube extends through the shaft 136 and terminates just short of the swaging dies 161.

The shaft 136 and the disc 180 are rotated in opposite directions and at speeds such that the peripheral speed of the inner cylindrical surface of the disc 180 is equal to the peripheral speed of the hammers 160 when striking the rollers 170.

The shaft 136 is rotated at a fairly high rate, namely 750 R. P. M. Due to centrifugal force, the hammers 160 and the dies 161 tend to move outwardly toward the rollers 170. When the hammers 160 strike the rollers 170 the dies 161 are directly behind them. Hence, the blow received by the hammers 160 striking the rollers 170 are directly transmitted through the shims 160a to the dies 161 causing them to pound against the tubing T to change its shape from that in Fig. 31, Sheet 5, to that shown in Fig. 35, Sheet 7. At the time the rollers 170 are struck by the hammers 161, the rollers are forced outwardly against the inner cylindrical surfaces of the disc 180 which is rotating in a direction opposite to the direction of rotation of the hammers 160. If, for example, the shaft 136 is rotating clockwise as viewed in Fig. 32, the upper hammer on striking the uppermost roller 170 will tend to cause the roller to move toward the right and be wedged against the adjacent boss 173 of the roller cage. This would tend to stop rotation of the roller 170, but this tendency is counteracted owing to the fact that the disc 180, which is rotating counterclockwise, tends to move the roller 170 toward the left. Thus any tendency of the hammer to bind the roller and to cause it to stop rotating is overcome by rotation of the disc 180. By the use of the rotating disc 180, the rollers 170 have a free turning action which is desirable in order to reduce friction and also to minimize the time of contact between the rollers and the hammer 160 thereby minimizing the time of contact between the dies 161 and the tubing. It is desirable that this time of contact be minimized, because the twisting or spiralling of the tubing which would result in spiral instead of longitudinal seams will be minimized. It will be remembered that the tubing is moving longitudinally at the rate of 18 ft. per minute (for ¼" O. D. tubing) while being acted upon by rotary swaging dies which do not move longitudinally with the tubing. Therefore, it is important that the blows delivered to the tubing be of as short duration as possible in order to minimize the spiralling of the tubing.

While tubing used for conducting liquids may be sufficiently strong although its seams have a certain amount of spiral, there are other uses of tubing which make it necessary that the seam be absolutely longitudinal. This is essential where the tubing is used for radio aerials mounted on the roofs of automobiles. Such tubing is generally chromium plated and highly polished; and it is desirable that the longitudinal outer seam be as inconspicuous as possible. Hence, the tubing should have the outer seam absolutely longitudinal so that the tubing can be mounted with the seam down and therefore out of sight.

Another advantageous feature of the swinging machine is the guide tube 193 through which the work passes after leaving the swaging die 161. This guide tube eliminates most of the whipping of the work T and keeps it from being distorted and scarred. In order to adapt the swager to different sizes of tubing, the only changes that are required are in the swaging dies 161 and in the guide tube 193. For ¼" O. D. tubing the radius $r$ in Fig. 38 is .124". These blocks are 1½" long and the restricted portions at the center are ½" and the flares are each ½" long. The guide tube 193 will have the same outside diameter, but the inside diameter will vary to accommodate different sizes of tubing. The arbor M which passes through the swager is a continuation of the arbor M of the rolling mill and is .187" to .189" in diameter for a ¼" tube.

The swager finishes the tubing into the shape shown in Fig. 35 with the plies closely compacted and the seams closely overlapping. The tubing then passes into the brazing furnace in which the temperature of the tubing is elevated to about 2100° F., and in which the tubing passes through a bath of copper which by capillary attraction almost instantly enters and fills the interstices between the seams and plies of the tubing. The excess copper is wiped off by a gas wiper or jet which envelopes the tubing as it passes from the brazing zone. Then the tubing passes through a cooler which is a water jacketed pipe containing a non-oxidizing atmosphere. The tubing is finally cooled by direct contact with water and rolled up into lengths of 1000 ft. The brazing apparatus is described and claimed in the co-pending application of Charles A. Nichols and Raymond H. Bish, Serial No. 199,556, filed April 2, 1938.

Referring again to Fig. 35 on Sheet 7, it will be noted that the two strips P₁ and P₂ which form the tab are interlocking. This is due to the fact that each layer of tubing comprises a portion of the inner ply and a portion of outer ply. Since the plies are interlocking, there can be no angular displacement of one ply with respect to the other. Where multiply tubing is formed from separate plies of stock in a manner such that the inner layer of the tube is provided in its entirety by one ply and the outer layer in its entirety by another ply, it is possible for an angular displacement between the two plies to take place during the formation of the tubing. This displacement is known as spiraling and occurs more frequently in larger sizes of tubing where the outside strip has a tendency to spiral independent of the inside strip. The result, therefore, is that in certain plies along the length of the tube the seams may be adjacent. This is objectionable because the tube is not as strong where the seams are adjacent. Since the forming rolls shape the plies for interlocking engagement, the swager must necessarily form diametrically opposite jogs in the plies which give the interlocking effect. Therefore, if the tube spirals at all while being formed, it must spiral as a whole. Since, due to the interlocking of the strip, they cooperate together to resist spiraling, there is twice the tendency to prevent a spiral.

Another advantage of the present method of forming tubing is that tighter seams are formed than in the case where an attempt is made to butt the bevelled edges of the same ply to form the seam. The scarfed or bevelled edges of the plies naturally tend to lie compactly along the jogs or offsets, hence there is no appreciable tendency to form voids in the seams near the scarfed edges.

A further advantage is that there are two seams appearing on the exterior of the tube; therefore, it is always easy to tell that these seams are properly spaced apart. Furthermore, the two seams provide two paths for the entrance of copper between the plies.

Still another advantage is that both plies are of the same width. This feature requires that there be only one-half the number of different sizes of stock as would be required for the manufacture of tubing in which the inner layer of tubing is provided entirely by the inner ply and the outer layer of the tube entirely by the outer ply. Naturally, only one half the number of manipulations are required to set up a scarfing machine for a particular size of tubing.

While the embodiment of the present invention as herein disclosed, constitutes a preferred form, it is to be understood that other forms might be adopted, all coming within the scope of the claims which follow.

What is claimed is as follows:

1. The method of making a double-wall tube from two strips of stock which comprises locating the strips in overlapping relation, simultaneously bending the overlapping portions of the strips so as to form substantially one-half inner and outer wall portions of the tube, forming that strip which provides a part of the outer wall portion so that said strip provides the remainder of the inner wall of the tube, forming the other strip to provide the remainder of the outer wall of the tube, and compacting the plies so that the edges of each one of the plies closely fit against the other ply.

2. The method of making a double-wall tube from two strips of stock which comprises beveling the strips so that the beveled edge surfaces are parallel to each other, locating the strips in overlapping relation, simultaneously bending the overlapping portions of the strips so as to form substantially one-half inner and outer wall portions of the tube, forming that strip which provides a part of the outer wall portion so that said strip provides the remainder of the inner wall of the tube, forming the other strip to provide the remainder of the outer wall of the tube, and compacting the plies together so that beveled edges of each of the plies closely fit against that intermediate portion of the other ply forming a jog from the inner to the outer wall portion of the tube.

3. The steps in the method of making a double-wall tube from two strips of stock which include locating the strips in overlapping relation, simultaneously bending the overlapping portions of the strips so as to form substantially one-half inner and outer wall portions of the tube, forming that strip which provides a part of the outer wall portion so that said strip provides the remainder of the inner wall of the tube, forming the other strip to provide the remainder of the outer wall of the tube.

4. Apparatus used in making a double-wall tube from two strips of stock which comprises means for locating the strips in overlapping relation, means for simultaneously bending the overlapping portions of the strips so as to form substantially one-half inner and outer wall portions of the tube, means for forming that strip which provides a part of the outer wall portion so that said strip provides the remainder of the inner wall of the tube, and means for forming the other strip to provide the remainder of the outer wall of the tube.

5. Apparatus used in making a double-wall tube from two strips of stock which comprises means for locating the strips in overlapping relation, means for simultaneously bending the overlapping portions of the strips so as to form substantially one-half inner and outer wall portions of the tube, means for forming over said mandrel that strip which provides a part of the outer wall of said tube so that said strip provides the remainder of the inner wall of the tube, means for forming around the mandrel the other strip to provide the remainder of the outer wall of said tube, and means for compacting the strips around said mandrel to close the space between the plies and the seams of the tube.

6. Apparatus used in making a double-wall tube from two strips of beveled edge stock, the beveled edges being substantially parallel, means for locating the strips in overlapping relation, means for simultaneously bending the overlapping portions of the strips so as to form substantially one-half inner and outer wall portions of the tube, means for forming portions of the strips into substantially one-half inner and outer wall portions of the tube, an arbor or mandrel, means for forming over said mandrel that strip which provides a part of the outer wall of said tube so that said strip provides the remainder of the inner wall of the tube, means for forming around the mandrel the other strip to provide the remainder of the outer wall of said tube, and means for compacting the strips around said mandrel to close the space between the plies and the seams of the tube, and to cause the beveled edges of each one of the plies to lie closely along the jog portion of the other ply.

CHARLES A. NICHOLS.
RAYMOND H. BISH.